United States Patent
Kubota et al.

(10) Patent No.: US 9,745,213 B2
(45) Date of Patent: Aug. 29, 2017

(54) SCALE SUPPRESSION APPARATUS, GEOTHERMAL POWER GENERATION SYSTEM USING THE SAME, AND SCALE SUPPRESSION METHOD

(71) Applicant: Fuji Electric Co., Ltd., Kawasaki-shi, Kanagawa (JP)

(72) Inventors: Kokan Kubota, Kanagawa (JP); Yoshitaka Kawahara, Kanagawa (JP); Ichiro Myogan, Kanagawa (JP); Osamu Kato, Iwate (JP)

(73) Assignee: Fuji Electric Co., Ltd, Kanagawa (JP)

( * ) Notice: Subject to any disclaimer, the term of this patent is extended or adjusted under 35 U.S.C. 154(b) by 429 days.

(21) Appl. No.: 14/396,374

(22) PCT Filed: Apr. 26, 2013

(86) PCT No.: PCT/JP2013/002873
§ 371 (c)(1),
(2) Date: Oct. 22, 2014

(87) PCT Pub. No.: WO2013/161325
PCT Pub. Date: Oct. 31, 2013

(65) Prior Publication Data
US 2015/0210567 A1  Jul. 30, 2015

(30) Foreign Application Priority Data

Apr. 27, 2012 (JP) .................................. 2012-103699

(51) Int. Cl.
*C02F 1/66* (2006.01)
*C02F 1/68* (2006.01)
(Continued)

(52) U.S. Cl.
CPC ................ *C02F 1/66* (2013.01); *C02F 5/083* (2013.01); *F01K 7/16* (2013.01); *F01K 19/00* (2013.01);
(Continued)

(58) Field of Classification Search
CPC .... C02F 1/008; C02F 1/66; C02F 5/08; C02F 5/083; C02F 5/10; C02F 5/12; C02F 5/14;
(Continued)

(56) References Cited

U.S. PATENT DOCUMENTS 3,455,157 A * 7/1969 Lahaye .................. E21B 47/06
73/152.55
4,550,434 A  10/1985 Shimada et al.
(Continued)

FOREIGN PATENT DOCUMENTS

JP  S59-130597 A  7/1984
JP  S63-039700 A  2/1988
(Continued)

OTHER PUBLICATIONS

D. Fukuda, Geothermal Technology, vol. 34, Nos. 1 & 2, Ser. No. 74, 51-57, 2009.
(Continued)

*Primary Examiner* — Joseph Drodge
(74) *Attorney, Agent, or Firm* — Young Basile Hanlon & MacFarlane, P.C.

(57) ABSTRACT

A scale suppression apparatus capable of suppressing in a low-priced manner the generation of silica-based scale and calcium-based scale in the influent water, a geothermal power generation system using the same, and a scale suppression method are provided. The apparatus includes a first addition unit configured to add liquid containing a chelating agent and an alkaline agent to influent water flowing through
(Continued)

a pipe arrangement to make the influent water higher than pH 7, a second addition unit configured to add an acid substance to the influent water to make the influent water lower than pH 7, and a controller configured to alternatively switch between the operation of the first addition unit and the operation of the second addition unit. The controller controls the switching of the first addition unit and the second addition unit based on the signals output from a scale detection unit and a pH meter.

12 Claims, 7 Drawing Sheets

(51) Int. Cl.
    C02F 5/08      (2006.01)
    F01K 7/16      (2006.01)
    F01K 19/00     (2006.01)
    F01K 25/08     (2006.01)
    F24J 3/08      (2006.01)
    F22B 37/56     (2006.01)
(52) U.S. Cl.
    CPC ............ *F01K 25/08* (2013.01); *F22B 37/56* (2013.01); *F24J 3/08* (2013.01); *C02F 1/683* (2013.01); *C02F 2209/001* (2013.01); *C02F 2209/003* (2013.01); *C02F 2209/005* (2013.01); *C02F 2209/03* (2013.01); *C02F 2209/06* (2013.01); *C02F 2209/40* (2013.01); *C02F 2303/22* (2013.01); *F24J 3/085* (2013.01); *F24J 2003/087* (2013.01); *Y02E 10/14* (2013.01)
(58) Field of Classification Search
    CPC .......... C02F 2209/001; C02F 2209/005; C02F 2209/02; C02F 2209/06; C02F 2209/10; C02F 2209/40; C02F 2209/44; C02F 1/683; C02F 5/02; C02F 2209/003; C09K 8/52; C09K 8/528; E21B 37/06; F03G 7/04; F01K 27/00; F01K 23/00; F01K 25/08; F01K 7/16; F01K 19/00; F24J 3/08; F24J 3/085; F24J 2003/087; F28F 19/00; Y02E 10/10; Y02E 10/30; Y02E 10/14; F22B 37/56
    USPC .......... 60/641.1–641.5; 210/85–90, 96.1, 97, 210/101–105, 138, 198.1, 199, 205, 206, 210/696–701, 747.7, 747.8, 749, 750, 210/752, 139, 143; 252/175–181
    See application file for complete search history.

(56) References Cited

U.S. PATENT DOCUMENTS

| | | | | |
|---|---|---|---|---|
| 4,974,446 | A * | 12/1990 | Vigneaux | E21B 17/1021 73/152.42 |
| 5,281,317 | A * | 1/1994 | Mani | B01D 53/501 204/538 |
| 5,409,614 | A * | 4/1995 | Gallup | C02F 1/042 166/267 |
| 5,656,172 | A * | 8/1997 | Kitz | C02F 1/66 166/310 |
| 5,665,242 | A | 9/1997 | Gallup | |
| 6,461,514 | B1 * | 10/2002 | Al-Samadi | B01D 61/022 210/638 |
| 6,761,865 | B1 * | 7/2004 | Gallup | C01B 33/22 210/696 |
| 7,470,330 | B2 * | 12/2008 | Keatch | C01F 11/462 134/2 |
| 8,881,811 | B2 * | 11/2014 | Reyes | C09K 8/528 166/279 |
| 2003/0132167 | A1 * | 7/2003 | Haase | C02F 1/008 210/696 |
| 2010/0000579 | A1 * | 1/2010 | Reinbold | A23C 7/02 134/34 |
| 2010/0300684 | A1 * | 12/2010 | Kotsonis | E21B 37/06 166/250.05 |
| 2011/0168395 | A1 * | 7/2011 | Welton | C09K 8/03 166/305.1 |
| 2011/0239649 | A1 * | 10/2011 | Myougan | F03G 7/04 60/641.2 |
| 2012/0161068 | A1 * | 6/2012 | Greene | C02F 5/10 252/181 |
| 2013/0014952 | A1 * | 1/2013 | Hopkins | E21B 43/16 166/308.1 |
| 2014/0165564 | A1 | 6/2014 | Inoue et al. | |

FOREIGN PATENT DOCUMENTS

| | | |
|---|---|---|
| JP | H06-320191 A | 11/1994 |
| JP | H09-206733 A | 8/1997 |
| JP | 2005-270903 A | 10/2005 |
| JP | 2010-090782 A | 4/2010 |
| JP | 2011-196197 A | 10/2011 |
| JP | 2013-043145 A | 3/2013 |

OTHER PUBLICATIONS

National stage application of PCT/JP2013/002872, filed concurrently herewith.
International Preliminary Report on Patentability in PCT/JP2013/002873 dated Oct. 28, 2014 and English translation thereof.
Japanese Office Action dated Nov. 18, 2015 to JP Patent Application No. 2012-103698, and its English translation.
Office Action dated Feb. 23, 2016 in related JP Patent Application No. 2012-103698, and its English translation.

* cited by examiner

FIG. 7
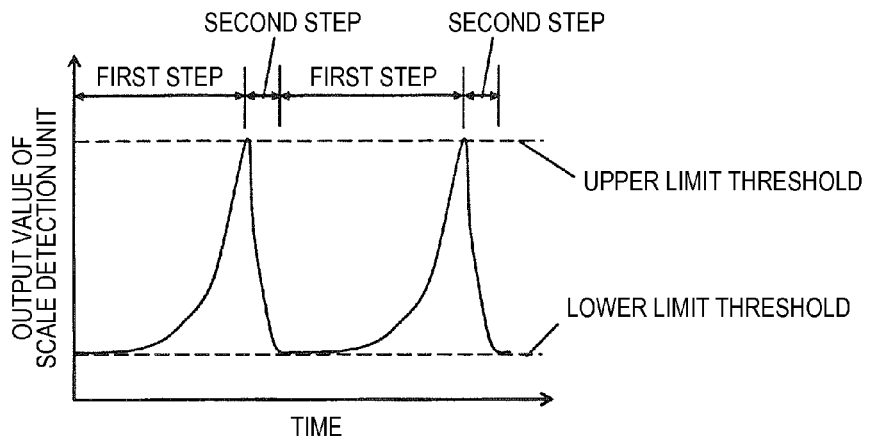
FIG. 8
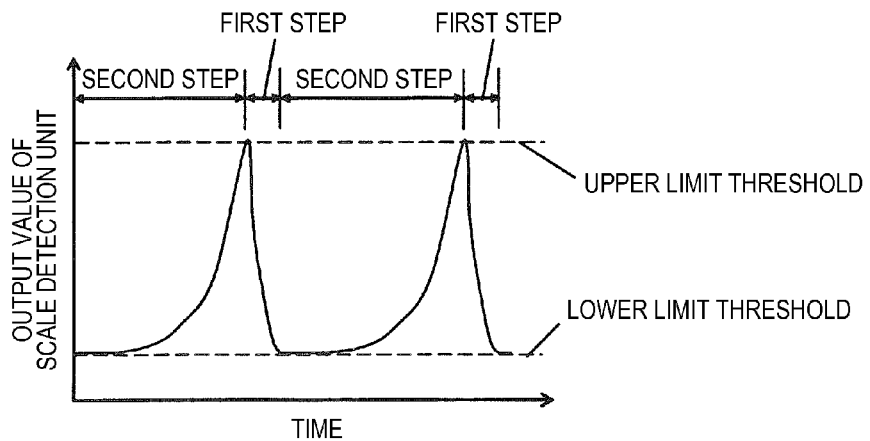
FIG. 9
|  | PRECIPITATE | DISSOLVED SUBSTANCE |
|---|---|---|
| FIRST STEP | COMPOUNDS PRECIPITATED (FOR EXAMPLE, CSH) BY REACTING WITH POLYVALENT METAL IONS ARE DISSOLVED | AMORPHOUS SILICA |
| SECOND STEP | AMORPHOUS SILICA | COMPOUNDS PRECIPITATED (FOR EXAMPLE, CSH) BY REACTING WITH POLYVALENT METAL IONS ARE DISSOLVED |

SCALE SUPPRESSION APPARATUS, GEOTHERMAL POWER GENERATION SYSTEM USING THE SAME, AND SCALE SUPPRESSION METHOD

TECHNICAL FIELD

The present disclosure relates to a scale suppression apparatus, a geothermal power generation system using the same, and a scale suppression method.

BACKGROUND

After a geothermal power generation system generates power by using steam or hot water blown out of a production well, the hot water—the temperature of which has dropped—is made to return to an injection well. Since the hot water of high temperature blown out of the production well contains more calcium and dissolved silica than those in the well water or the river water, scale such as calcium carbonate or amorphous silica is easily precipitated. In particular, in the terrestrial part and in the injection well, there is a problem of suppressing generation of silica scale due to the temperature drops of hot water in the terrestrial part.

Generally, a sulfuric acid injection method is used as a suppression method of the silica scale. In the sulfuric acid injection method, the polymerization rate of silica is suppressed by lowering the pH of hot water to reduce the scale precipitation amount. However, as the sulfuric acid injection method merely decreases the polymerization rate of silica, silica is expected to be precipitated after a sufficient time passes in the injection well. In addition, as the sulfate ion density increases, the possibility that scale such as anhydrite or the like is precipitated increases. Further, there is a problem that piping or the like is eroded with acid.

As an attempt to solve these problems, there is a method of alkalizing hot water (for example, see Daisuke Fukuda, *Geothermal Technology*, Vol. 34, Nos. 1 & 2 (Ser. No 74) 51-57, 2009) (hereinafter "Fukuda"). In other words, the solubility of amorphous silica becomes higher as the alkalinity become higher, and it suddenly rises at pH 8 or more, in particular. Therefore, silica scale is hardly generated in a high pH solution. Further, this effect continues in the injection well, since the silica precipitation amount does not increase even if the time passes, which contrasts with the above-mentioned method of suppressing the rate of silica polymerization. Furthermore, disclosed is a method of suppressing the precipitation of calcium carbonate, anhydrite, or magnesium silicate in the production well, by also using a chelating agent of catching calcium or magnesium in the production well.

BRIEF SUMMARY

In the method disclosed in Fukuda, the chelating agent is injected into the production well, whereas an alkaline agent is injected into its terrestrial part. However, a sufficient amount of chelating agent catches the calcium ion, and the generation of calcium silicate hydrates (hereinafter, simply referred to as CSH) can be prevented, whereas a large amount of the chelating agent is demanded to be injected. In general, the chelating agent is an expensive agent, and there is a problem of not being economical.

In order to address the above drawback of Fukuda, in a first aspect of the present disclosure, there is provided a scale suppression apparatus of suppressing generation of scale in influent water containing at least a silica component and a calcium component. The scale suppression apparatus comprises a controller configured to alternately switch between an operation of a first addition unit and an operation of a second addition unit, the first addition unit being configured to add a chelating agent and an alkaline agent to the influent water to make the influent water higher than pH 7, and the second addition unit being configured to add an acid substance to the influent water to make the influent water lower than pH 7.

With such a configuration, while the second addition unit is being operated, amorphous silica of super saturation is precipitated, whereas while the first addition unit is being operated, the precipitated amorphous silica can be dissolved. On the other hand, while the alkaline agent is being injected, compounds (for example, CSH) are precipitated by reacting with polyvalent metal ions unless a sufficient amount of chelating agent is injected. However, by adding the acid substance, the compounds can be dissolved. In addition, the precipitation rate of amorphous silica is lowered by adding the acid substance. By alternately repeating the operation of the first addition unit and the operation of the second addition unit, it is possible to minimize the use amount of the chelating agent, which is an expensive agent. Both the amorphous silica and the compounds can be dissolved alternately, and the scale generation can be suppressed in the long term.

In a second aspect of the present disclosure, the controller may be configured to alternately switch between the operation of the first addition unit and the operation of the second addition unit at a predefined interval.

With such a configuration, switching can be operated automatically at a predefined interval by a timer function of the controller.

In a third aspect of the present disclosure, the scale suppression apparatus may further comprise a scale detection unit configured to detect a precipitation state of the scale on a downstream side from an addition point to which the chelating agent, the alkaline agent, and the acid substance are added. Further, the controller may be configured to include a memory configured to store an output signal from the scale detection unit and a calculation unit configured to calculate an index of the injection operation based on the output signal from the scale detection unit. The controller may also be configured to control switching alternately between adding by the first addition unit and adding by the second addition unit by comparing a calculation result of the calculation unit with an upper limit threshold and a lower limit threshold.

With such a configuration, the addition timing of the chelating agent and the alkaline agent and the addition timing of the acid substance can be determined automatically according to the output value from the scale detection unit.

In a fourth aspect of the present disclosure, the scale detection unit may include: a scale precipitation unit; an upstream-side manometer configured to measure a pressure on an upstream side of the scale precipitation unit and output a signal to the controller; and a downstream-side manometer configured to measure a pressure on a downstream side of the scale precipitation unit and output a signal to the controller.

With such a configuration, the controller calculates a pressure difference between the output values from the manometers before and after the scale precipitation unit. When the pressure difference is higher than the upper limit threshold or is lower than the lower limit threshold, the first addition unit and the second addition unit are switched. Accordingly, it is possible to automatically dissolve amorphous silica and the compounds alternately in accordance with the pressure that varies depending on the adhesion amount of the scale at the scale precipitation unit. It is to be noted that instead of the provisions of the upstream-side manometer and the downstream-side manometer, a differential manometer for obtaining the pressure difference before and after the scale precipitation unit may be used to input a pressure difference signal output from the differential manometer into the controller.

In a fifth aspect of the present disclosure, the scale detection unit may include: a scale precipitation unit; and a flowmeter configured to measure a flow rate of water flowing through the scale precipitation unit and output a signal to the calculation unit. The controller may obtain a value by subtracting a subsequent flow rate from the flow rate below the lower limit threshold.

With such a configuration, when the flow rate difference is higher than the upper limit threshold or lower than the lower limit threshold, the first addition unit and the second addition unit are switched. Accordingly, it is possible to automatically dissolve amorphous silica and compounds alternately in accordance with the flow rate of the influent water that varies depending on the adhesion amount of the scale at the scale precipitation unit.

In a sixth aspect of the present disclosure, there may be a period while none of the chelating agent, the alkaline agent, or the acid substance is added, at least one of when the controller switches the operation of the first addition unit to the operation of the second addition unit or when the controller switches the operation of the second addition unit to the operation of the first addition unit.

In the influent water that is acidized by adding the acid substance, metals are ionized. When the pH of the influent water is changed to alkaline side, the ionized metals become hydroxides. Thus, the effect of agglutinating the scale is enhanced and the generation rate of amorphous silica becomes faster. By setting the period while the addition of the alkaline agent and the acid substance is stopped, the influent water to which the acid substance is added is not mixed with the influent water to which the alkaline agent is added. Accordingly, it is possible to suppress the generation of amorphous silica when the operation is switched from the step of adding the acid substance to the step of adding the chelating agent and the alkaline agent. In addition, it is possible to suppress the generation of precipitate or heat of neutralization by directly mixing the chelating agent and the alkaline agent supplied from the reserved tank for the chelating agent and the alkaline agent with the acid substance supplied from the reserved tank for the acid substance.

In a seventh aspect of the present disclosure, there is provided a geothermal power generation system comprising: an evaporator configured to evaporate a medium with geothermal water; a turbine configured to rotate with the medium; a power generator configured to be coupled to the turbine and generate the power with rotational power of the turbine; a condenser configured to condense the medium come out of the turbine; a circulation pump configured to feed the medium condensed by the condenser to the evaporator; and a scale suppression unit according to any one of the above first through sixth aspects, configured to use the geothermal water that has passed through the evaporator as influent water.

With such a configuration, it is possible to suppress the generation of amorphous silica and CSH adhered to the pipe arrangement above the ground or in the injection well, and reduce the maintenance frequency of the pipe arrangement above the ground and in the injection well.

In a seventh aspect of the present disclosure, there is provided a scale suppression method of suppressing generation of scale in influent water containing at least a silica component and a calcium component, the scale suppression method comprising: a first step of adding a chelating agent and an alkaline agent to the influent water to make the influent water higher than pH 7; and a second step of adding an acid substance to the influent water to make the influent water lower than pH 7, where the first step and the second step are alternately switched.

With such a configuration, in the first step of injecting the chelating agent and the alkaline agent into the influent water, it is possible to dissolve amorphous silica that has already been generated by increasing the solubility of amorphous silica. In the second step of adding the acid substance to the influent water it is possible to dissolve the compounds generated in the first step. The use amount of the chelating agent that is an expensive agent is minimized, both of amorphous silica and the compounds are dissolved alternatively, and the scale can be suppressed in a long term.

In a ninth aspect of the present disclosure, there may be a period while none of the chelating agent, the alkaline agent, or the acid substance is added, at least one of when the operation of the first addition unit is switched to the operation of the second addition unit or when the operation of the second addition unit is switched to the operation of the first addition unit.

In the influent water that is acidized by adding the acid substance, metals are ionized. When the pH of the influent water is rapidly changed to alkaline side, the ionized metals become hydroxides. Thus, the effect of agglutinating the scale is enhanced and the silica polymerization reaction rate becomes faster easily. By setting the period while none of the chelating agent, the alkaline agent or the acid substance is added, the influent water to which the acid substance is added is not mixed with the influent water to which the alkaline agent is added. Accordingly, it is possible to suppress the generation of amorphous silica when the operation is switched from the second step of adding the acid substance to the first step of adding the chelating agent and the alkaline agent.

According to the present disclosure, in the influent water containing at least a silica component and a calcium component, it is possible to suppress in a low-priced manner the generation of silica-based scale and calcium-based scale.

BRIEF DESCRIPTION OF THE DRAWINGS

FIG. 7 is a view illustrative of variations with time in output values from a scale detection unit when a first step is performed earlier;

FIG. 8 is a view illustrative of variations with time in output values from a scale detection unit when a second step is performed earlier;

FIG. 9 is a view illustrative of relationships between precipitate and a dissolved substance in a case where liquid containing a chelating agent and an alkaline agent is injected into influent water (first step) and in a case where the injection of liquid containing an acid substance is injected (second step);

DETAILED DESCRIPTION

Embodiments of the present disclosure will be described with reference to the drawings. It is to be noted that the present disclosure is not limited to the following embodiments, and the embodiments may be changed as necessary without departing from the scope of the present disclosure.

(First Embodiment)

Figure 1:
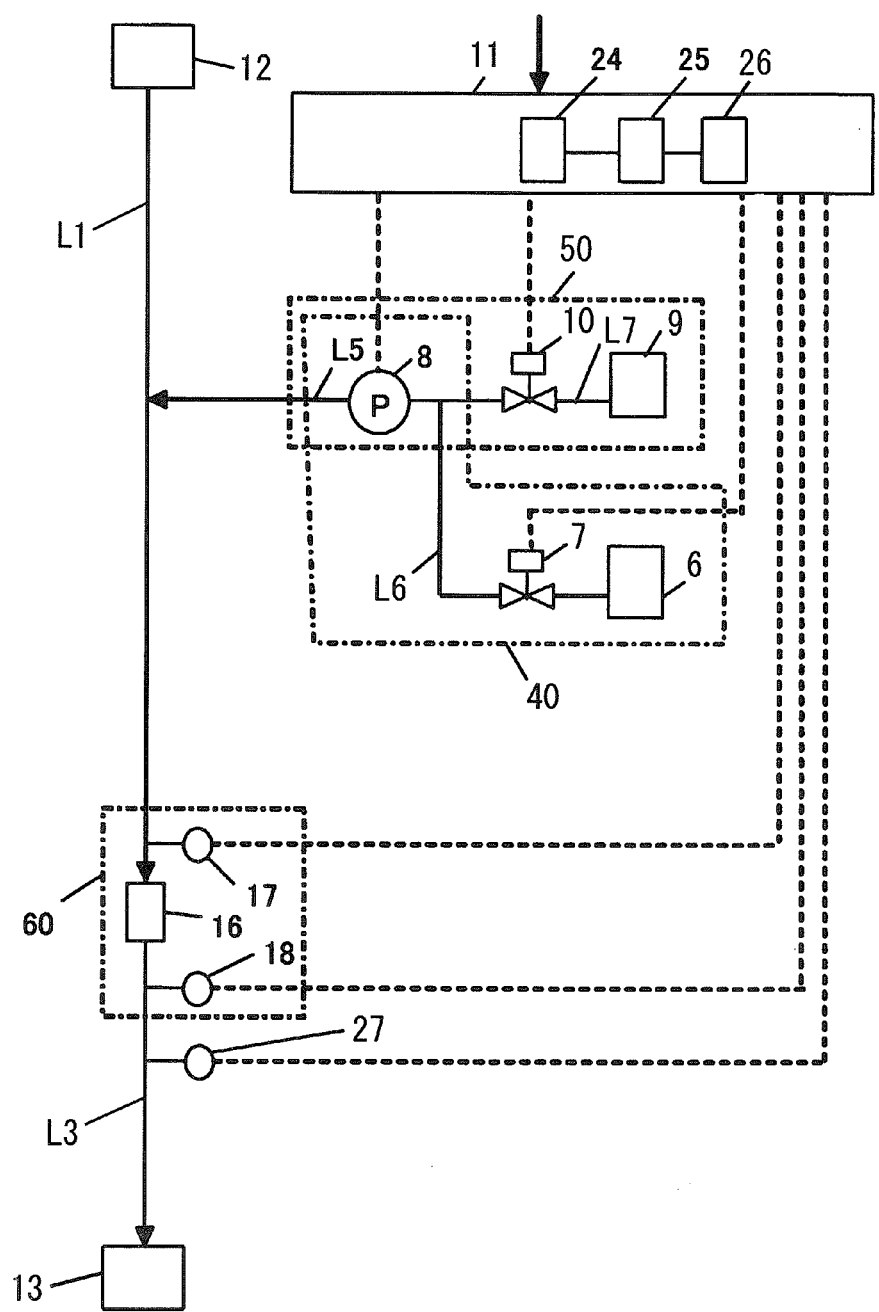
FIG. 1 is a schematic configuration view of a scale suppression apparatus according to a first embodiment of the present disclosure.

FIG. 1 is a schematic configuration view of a scale suppression apparatus according to a first embodiment of the present disclosure. The scale suppression apparatus according to the first embodiment of the present disclosure is an apparatus of suppressing the generation of silica-based scale and calcium-based scale occur in influent water containing at least a silica component and a calcium component, and includes a pipe arrangement L1, a first addition unit 40, a second addition unit 50, a scale detection unit 60, a pipe arrangement L3, a pH meter 27, and a controller 11.

The pipe arrangement L1 leads the influent water that has flowed from an influent water inlet 12 to the scale detection unit 60, and one end of the pipe arrangement L1 is connected to an inlet part of the scale detection unit 60.

The first addition unit 40 injects liquid containing a chelating agent and alkaline agent (i.e., alkaline liquid) into the influent water flowing through the pipe arrangement L1 to make the influent water higher than pH 7, and includes a tank 6 configured to reserve the liquid containing the chelating agent and alkaline agent (i.e., alkaline liquid), a pump 8 configured to inject the liquid reserved in the tank 6 into the pipe arrangement L1, a pipe arrangement L6 configured to connect a liquid outlet port of the tank 6 and an inlet port of the pump 8, and a pipe arrangement L5 configured to connect an exhaust port of the pump 8 and an injection port of the pipe arrangement L1.

In addition, the first addition unit 40 has a valve 7 for opening and closing the intake side of the pump 8, and the valve 7 is arranged in a pathway of the pipe arrangement L6.

The second addition unit 50 adds liquid containing an acid substance (i.e., acid liquid) to the influent water flowing through the pipe arrangement L1 to make the influent water lower than pH 7, and includes a tank 9 configured to reserve the liquid containing the acid substance, a pipe arrangement L7 configured to supply the liquid reserved in the tank 9 to an intake side of the pump 8, and an on-off valve 10 arranged in a pathway of the pipe arrangement L7.

The scale detection unit 60 detects a precipitation state of the scale on a downstream side from the addition point where the chelating agent, the alkaline agent, and the acid substance are added, and includes a scale precipitation unit 16 configured to precipitate the scale generated in the influent water. The scale precipitation unit 16 has a pipe line in which, for example, the influent water flows. The cross section of the flow path in the pipe line is changed as the scale is adhered to the inner face of the pipe line.

In addition, the scale detection unit 60 includes an upstream-side manometer 17 configured to detect an upstream-side pressure of the scale precipitation unit 16, and a signal output from the upstream-side manometer 17 is supplied to controller 11 as upstream-side pressure information of the scale precipitation unit 16. Further, the scale detection unit 60 has a downstream-side manometer 18 configured to detect a downstream-side pressure of the scale precipitation unit 16, and a signal output from the downstream-side manometer 18 is supplied to the controller 11 as downstream-side pressure information of the scale precipitation unit 16.

The pipe arrangement L3 supplies the influent water that has flowed through the scale detection unit 60 to an injection well 13, and one end of the pipe arrangement L3 is connected to an outlet unit of the scale detection unit 60.

The pH meter 27 measures the pH of the influent water that flows through the pipe arrangement L3. A signal output from the pH meter 27 is supplied to the controller 11 as pH information of the influent water.

The controller 11 controls the pump 8 and the valves 7 and 10 based on the precipitation state of the scale detected by the scale detection unit 60 or the pH of the influent water measured by the pH meter 27, and includes a memory 24 configured to store the pressure measured by the manometers 17 and 18 of the scale detection unit 60, a calculation unit 25 configured to calculate a pressure difference between the upstream-side pressure measured by the manometer 17 and the downstream-side pressure measured by the manometer 18, and a comparison unit 26 configured to compare the pressure difference calculated by the calculation unit 25 with an upper limit threshold and a lower limit threshold.

It is to be noted that the controller 11 is connected to an input-output unit, not illustrated, so that the input-output unit can change various set values and take out data.

Figure 6:
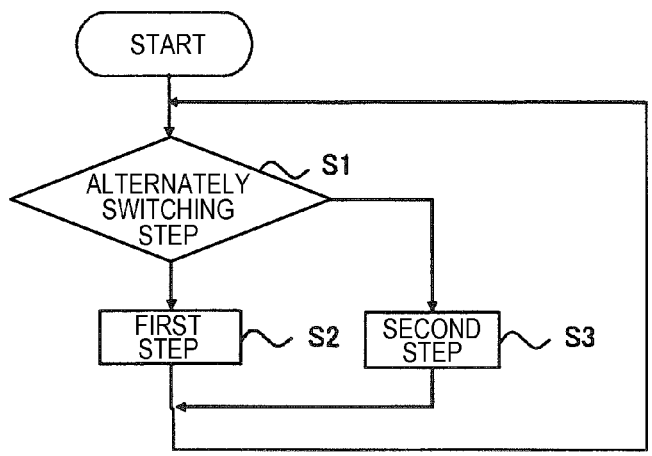
FIG. 6 is a flow chart illustrative of a scale suppression method according to the present disclosure.

In the scale suppression apparatus in the first embodiment, as illustrated in FIG. 6, a first step S2 of adding from the first addition unit 40 the liquid containing the chelating agent and alkaline agent into the pipe arrangement L1 through which the influent water flows and a second step S3 of adding from the second addition unit 50 the liquid containing the acid substance are alternately switched in a switch step S1 to suppress the generation of the scale. In this case, the first step S2 may be carried out earlier and then the second step S3 may be carried out later, or the second step S3 may be carried out earlier and then the first step S2 may be carried out later.

When the first step S2 is carried out earlier, scale (for example, CSH) is gradually precipitated at the scale precipitation unit 16 of the scale detection unit 60. The output value (i.e., pressure difference) from the scale detection unit 60 increases gradually as the first step S2 proceeds, as illustrated in FIG. 7. Then, when the output value (i.e., pressure difference) from the scale detection unit 60 exceeds the upper limit threshold, the first step S2 is switched to the second step S3, and the liquid containing the acid substance is added to the pipe arrangement L1 from the second addition unit 50.

When the first step S2 is switched to the second step S3, the scale (for example, CSH) precipitated at the scale precipitation unit 16 is dissolved, and the output value (i.e., pressure difference) from the scale detection unit 60 decreases, accordingly. Then, when the output value (i.e., pressure difference) from the scale detection unit 60 becomes lower than the lower limit threshold, the second step S3 is switched to the first step S2, and the liquid containing the chelating agent and alkaline agent is added from the first addition unit 40 to the pipe arrangement L1. Subsequently, as discussed above, the first step S2 and the second step S3 are repeated alternately.

On the other hand, when the second step S3 is carried out earlier, for example, amorphous silica is precipitated at the scale precipitation unit 16 of the scale detection unit 60. In this situation, the output value (i.e., pressure difference) from the scale detection unit 60 gradually increases as the second step S3 proceeds, as illustrated in FIG. 8. Then, when the output value (i.e., pressure difference) of the scale detection unit 60 exceeds the upper limit threshold, the second step S3 is switched to the first step S2, and the liquid containing the chelating agent and alkaline agent is added from the first addition unit 40 to the pipe arrangement L1.

When the second step S3 is switched to the first step S2, amorphous silica precipitated by the scale precipitation unit 16 is dissolved, and the output value (i.e., pressure difference) from the scale detection unit 60 decreases, accordingly. Then, when the output value (i.e., pressure difference) from the scale detection unit 60 becomes lower than the lower limit threshold, the first step S2 is switched to the second step S3, and the liquid containing the acid substance is added to the pipe arrangement L1 from the second addition unit 50. Subsequently, as discussed above, the second step S3 and the first step S2 are repeated alternately.

In the first step S2, the pump 8 is activated together with opening of the valve 7 and closing of the valve 10. Then, the liquid (i.e., liquid containing the chelating agent and alkaline agent) reserved in the tank 6 flows through the pipe arrangements L6 and L5, and is injected into the pipe arrangement L1.

In the second step S3, the pump 8 is activated together with closing of the valve 7 and opening of the valve 10. Then, the liquid (i.e., liquid containing the acid substance) is injected through the pipe arrangements L7 and L5 into the pipe arrangement L1.

By carrying out the above-described first step S2 and second step S3 alternately in many variations as described above, the generation of the scale can be suppressed.

FIG. 9 illustrates relationships between precipitate and a dissolved substance in a case where the liquid containing the chelating agent and alkaline agent is injected into the influent water (i.e., first step S2) and in a case where the injection of the liquid containing the acid substance (i.e., second step S3). When the liquid containing the chelating agent and alkaline agent is injected into the pipe arrangement L1 from the first addition unit 40, as illustrated in FIG. 9, the liquid reacts with polyvalent metal ions contained in the influent water, and compounds (for example, CSH) are precipitated. In addition, amorphous silica is dissolved (i.e., first step S2).

On the other hand, when the liquid containing the acid substance is added from the second addition unit 50 to the pipe arrangement L1, as illustrated in FIG. 9, amorphous silica is precipitated. In addition, compounds precipitated (for example, CSH) by reacting with polyvalent metal ions are dissolved (i.e., second step S3).

As in the first embodiment, the first step S2 of adding the chelating agent and alkaline agent into the influent water to make the influent water higher than pH 7 and the second step S3 of adding the acid substance to make the influent water lower than pH 7 are switched alternately, so that the added amounts of the chelating agent and the alkaline agent can be reduced and reduction of the cost can be achieved.

In addition, the precipitation state of the scale in the influent water is detected by the scale detection unit 60 and the operation of the first addition unit 40 and the operation of the second addition unit 5 are switched based on the signal output from the scale detection unit 60, so that the added amounts of the chelating agent and the alkaline agent can be reduced more.

(Second Embodiment)

Figure 2:
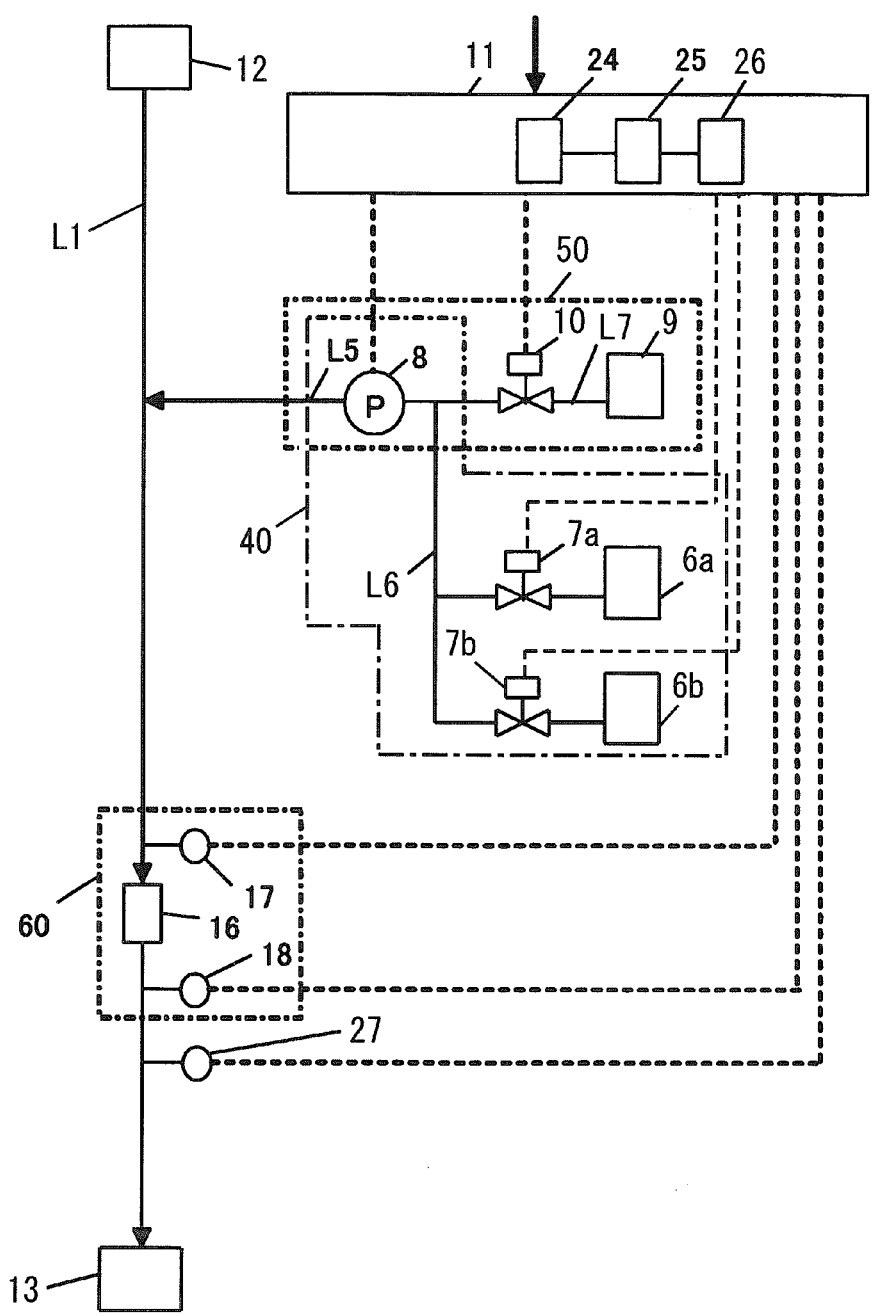
FIG. 2 is a schematic configuration view of a scale suppression apparatus according to a second embodiment of the present disclosure.

In the above-described first embodiment, the first addition unit configured to add the liquid containing the chelating agent and alkaline agent into the pipe arrangement L1 through which the influent water flows includes the tank 6 configured to reserve the liquid containing the chelating agent and alkaline agent, the pump 8 configured to inject the liquid reserved in the tank 6 into the pipe arrangement L1, the pipe arrangement L6 configured to connect the outlet port of the tank 6 and the inlet port of the pump 8, the pipe arrangement L5 configured to connect the exhaust port of the pump 8 and the injection port of the pipe arrangement L1, and the valve 7 arranged in the pathway of the pipe arrangement L6 has been illustrated. However, the present disclosure is not limited to the above configuration. As illustrated in FIG. 2, for example, in a second embodiment, the first addition unit 40 configured to inject the liquid containing the chelating agent and alkaline agent into the pipe arrangement L1 through which the influent water flows may include a tank 6a configured to reserve the liquid containing the chelating agent, a tank 6b configured to reserve the liquid containing the alkaline agent, the pump 8 configured to inject the liquid reserved in the tanks 6a and 6b into the pipe arrangement L1, the pipe arrangement L5 configured to connect the exhaust port of the pump 8 and the injection port of the pipe arrangement L1, and valves 7a and 7b configured to open and close liquid outlet ports of the tanks 6a and 6b, respectively.

(Third Embodiment)

Figure 3:
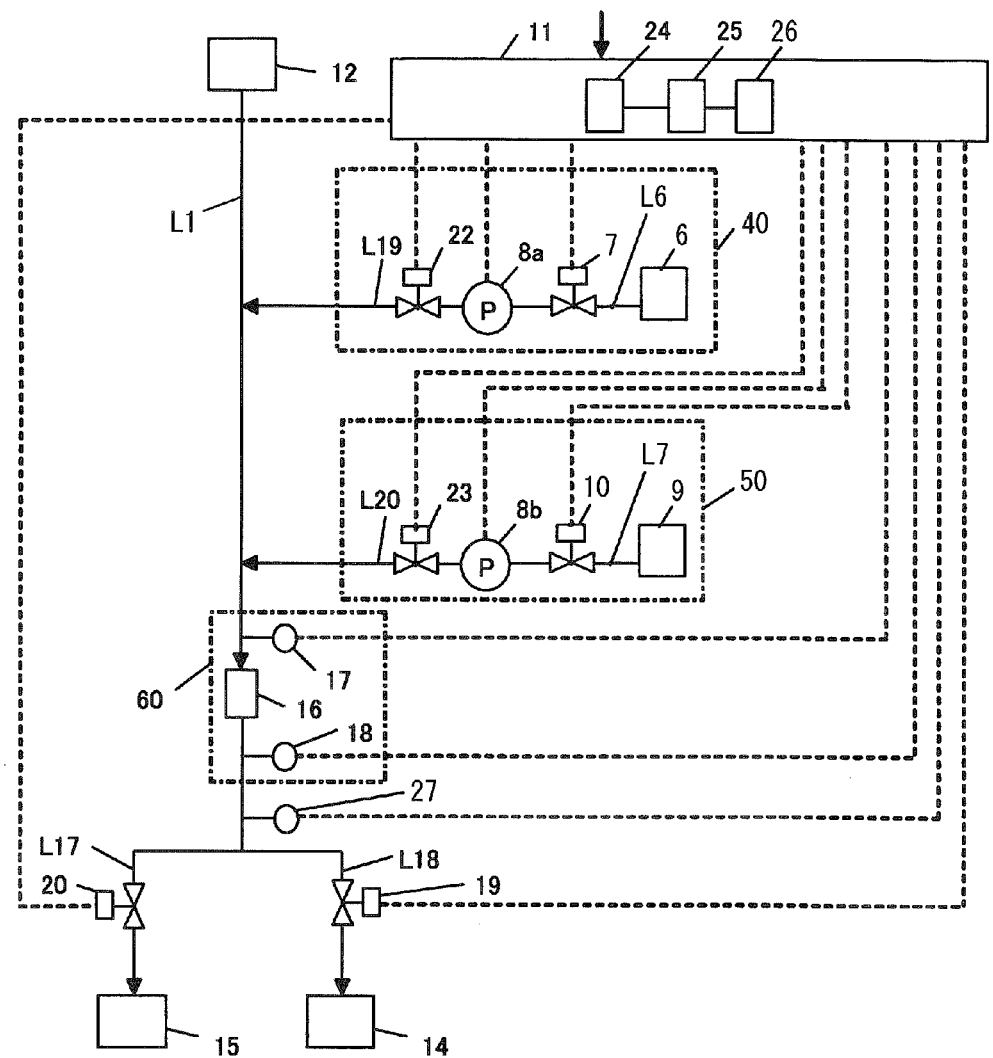
FIG. 3 is a schematic configuration view of a scale suppression apparatus according to a third embodiment of the present disclosure.

FIG. 3 is a schematic configuration view of the scale suppression apparatus according to a third embodiment of the present disclosure. The scale suppression apparatus according to the third embodiment, as illustrated in FIG. 3, includes the pipe arrangement L1, the first addition unit 40, the second addition unit 50, the scale detection unit 60, pipe arrangements L17 and L18, valves 19 and 20, the pH meter 27, and the controller 11.

The pipe arrangement L1 leads the influent water that has flowed from an influent water inlet 12 to the scale detection unit 60, and one end of the pipe arrangement L1 is connected to the inlet part of the scale detection unit 60.

The first addition unit 40 injects the liquid containing the chelating agent and alkaline agent into the influent water flowing through the pipe arrangement L1 to make the influent water higher than pH 7. The first addition unit 40 includes the tank 6 configured to reserve the liquid containing the chelating agent and alkaline agent (i.e., alkaline liquid), a pump 8a configured to inject the liquid reserved in the tank 6 into the pipe arrangement L1, the pipe arrangement L6 configured to connect the liquid outlet port of the tank 6 and the inlet port of the pump 8a, and the pipe arrangement L19 configured to connect the exhaust port of the pump 8 and the injection port of the pipe arrangement L1.

In addition, the first addition unit 40 has the valves 7 and 22 are arranged in the pathways of the pipe arrangements L6 and L19, respectively.

The second addition unit 50 adds the liquid containing the acid substance (i.e., acid liquid) to the influent water flowing through the pipe arrangement L1 to make the influent water lower than pH 7. The second addition unit 50 includes a tank 9 configured to reserve the liquid containing the acid substance, a pump 8b configured to inject the liquid reserved in the tank 9 into the pipe arrangement L1, a pipe arrangement L7 configured to connect the liquid outlet port of the tank 9 and the inlet port of the pump 8b, and the pipe arrangement L20 configured to connect the exhaust port of the pump 8b and the injection port of the pipe arrangement L1.

Further, the second addition unit 50 has valves 10 and 23 are arranged in the pathways of the pipe arrangements L7 and L20, respectively. It is to be noted that the valves 22 and 23 are not necessarily provided, but the provisions of the valves 22 and 23 enable maintenance with ease when a failure occurs at the pumps 8a and 8b, respectively.

The scale detection unit 60 detects the precipitation state of the scale on a downstream side from the addition point into which the chelating agent, the alkaline agent, and the acid substance are added, and includes the scale precipitation unit 16 configured to precipitate the scale generated in the influent water. The scale precipitation unit 16 has a pipe line through which, for example, the influent water flows. The cross section of the flow path in the pipe line is changed as the scale is adhered to the inner face of the pipe line.

In addition, the scale detection unit 60 includes the upstream-side manometer 17 configured to detect the upstream-side pressure of the scale precipitation unit 16, and the signal output from the upstream-side manometer 17 is supplied to controller 11 as the upstream-side pressure information of the scale precipitation unit 16. Further, the scale detection unit 60 has the downstream-side manometer 18 configured to detect the downstream-side pressure of the scale precipitation unit 16, and the signal output from the downstream-side manometer 18 is supplied to the controller 11 as the downstream-side pressure information of the scale precipitation unit 16.

The pipe arrangement L17 supplies the influent water that has flowed through the scale detection unit 60 to an acidity injection well 15, and is connected to an inlet part of the acidity injection well 15.

The pipe arrangement L18 supplies the influent water that has flowed through the scale detection unit 60 to an alkalinity injection well 14, and is connected to an inlet part of the alkalinity injection well 14.

The valve 19 blocks the influent water that has flowed through the scale detection unit 60 from being injected into the alkalinity injection well 14, and is arranged in a pathway of the pipe arrangement L18.

The valve 20 blocks the influent water that has flowed through the scale detection unit 60 from being injected into the acidity injection well 15, and is arranged in a pathway of the pipe arrangement L17.

The pH meter 27 measures the pH of the influent water that flows through the scale detection unit 60. The signal output from the pH meter 27 is supplied to the controller 11 as pH information of the influent water.

The controller 11 controls the pumps 8a and 8b and the valves 7, 10, 19, 20, 22 and 23 based on the precipitation state of the scale detected by the scale detection unit 60 and the pH of the influent water measured by the pH meter 27, and includes the memory 24 configured to store the pressures measured by the manometers 17 and 18 of the scale detection unit 60, the calculation unit 25 configured to calculate a pressure difference between the upstream-side pressure measured by the manometer 17 and the downstream-side pressure measured by the manometer 18, and the comparison unit 26 configured to compare the pressure difference calculated by the calculation unit 25 with an upper limit threshold and a lower limit threshold.

In the scale suppression apparatus in the third embodiment, as illustrated in FIG. 6, the first step S2 of adding the liquid containing the chelating agent and alkaline agent to the influent water flowing through the pipe arrangement L1 from the first addition unit 40 and the second step S3 of adding the liquid containing the acid substance from the second addition unit 50 are switched alternately in a switch step S1 to suppress the generation of the scale. In this case, the first step S2 may be carried out earlier and then the second step S3 may be carried out later, or the second step S3 may be carried out earlier and then the first step S2 may be carried out later.

In the third embodiment, when the first step S2 is carried out earlier, scale (for example, CSH) is gradually precipitated at the scale precipitation unit 16 of the scale detection unit 60. The output value (i.e., pressure difference) from the scale detection unit 60 increases gradually as the first step S2 proceeds, as illustrated in FIG. 7. Then, when the output value (i.e., pressure difference) from the scale detection unit 60 exceeds the upper limit threshold, the first step S2 is switched to the second step S3, and the liquid containing the acid substance is added to the pipe arrangement L1 from the second addition unit 50.

When the first step S2 is switched to the second step S3, the scale (for example, CSH) precipitated at the scale precipitation unit 16 is dissolved, and the output value (i.e., pressure difference) from the scale detection unit 60 decreases accordingly. Then, when the output value (i.e., pressure difference) from the scale detection unit 60 becomes lower than the lower limit threshold, the second step S3 is switched to the first step S2, and the liquid containing the chelating agent and alkaline agent is added from the first addition unit 40 to the pipe arrangement L1. Subsequently, as discussed above, the first step S2 and the second step S3 are repeated alternately.

On the other hand, when the second step S3 is carried out earlier, for example, amorphous silica is precipitated at the scale precipitation unit 16 of the scale detection unit 60. In this situation, the output value (i.e., pressure difference) from the scale detection unit 60 gradually increases as the second step S3 proceeds, as illustrated in FIG. 8. Then, when the output value (i.e., pressure difference) of the scale detection unit 60 exceeds the upper limit threshold, the second step S3 is switched to the first step S2, and the liquid containing the chelating agent and alkaline agent is added from the first addition unit 40 to the pipe arrangement L1.

When the second step S3 is switched to the first step S2, amorphous silica precipitated at the scale precipitation unit 16 is dissolved, and the output value (i.e., pressure difference) of the scale detection unit 60 decreases, accordingly. Then, when the output value (i.e., pressure difference) from the scale detection unit 60 becomes lower than the lower limit threshold, the first step S2 is switched to the second step S3, and the liquid containing the acid substance is added to the line arrangement L1 from the second addition unit 50. Subsequently, as discussed above, the second step S3 and the first step S2 are repeated alternately.

In the first step S2, the pump 8 is activated together with opening of the valves 7, 19, and 22 and closing of the valves 10, 20, and 23. Then, the liquid (i.e., liquid containing the chelating agent and alkaline agent) reserved in the tank 6 flows through the pipe arrangements L6 and L19, and is injected into the pipe arrangement L1. In this situation, the influent water exhausted from the scale detection unit 60 is supplied to the alkalinity injection well 14, flowing through the pipe arrangement L18.

In the second step S3, the pump 8 is stopped together with closing of the valves 7, 19, and 22 and opening of the valves 10, 20, and 23. Then, the liquid (i.e., liquid containing the acid substance) reserved in the tank 9 flows through the pipe arrangements L7 and L20, and is injected into the pipe arrangement L1. In this situation, the influent water exhausted from the scale detection unit 60 is supplied to the acidity injection well 15, flowing through the pipe arrangement L17.

When the liquid containing the chelating agent and alkaline agent is injected into the pipe arrangement L1 from the first addition unit 40, as illustrated in FIG. 9, the liquid reacts with polyvalent metal ions contained in the influent water, and compounds (for example, CSH) are precipitated. In addition, amorphous silica is dissolved (i.e., first step S2).

On the other hand, when the liquid containing the acid substance is added from the second addition unit 50 to the pipe arrangement L1, as illustrated in FIG. 9, amorphous silica is precipitated. In addition, compounds precipitated (for example, CSH) by reacting with polyvalent metal ions are dissolved (i.e., second step S3).

As in the third embodiment, the first step S2 of adding the liquid containing the chelating agent and alkaline agent into the influent water to make the influent water higher than pH 7 and the second step S3 of adding the liquid containing the acid substance to make the influent water lower than pH 7 are switched alternately, so that the added amounts of the chelating agent and the alkaline agent can be reduced and reduction of the cost can be achieved.

In addition, the precipitation state of the scale in the influent water is detected by the scale detection unit 60 and the operation of the first addition unit 40 and the operation of the second addition unit 5 is switched based on the signal output from the scale detection unit 60, so that the added amounts of the chelating agent and the alkaline agent can be reduced more.

(Fourth Embodiment)

Figure 4:
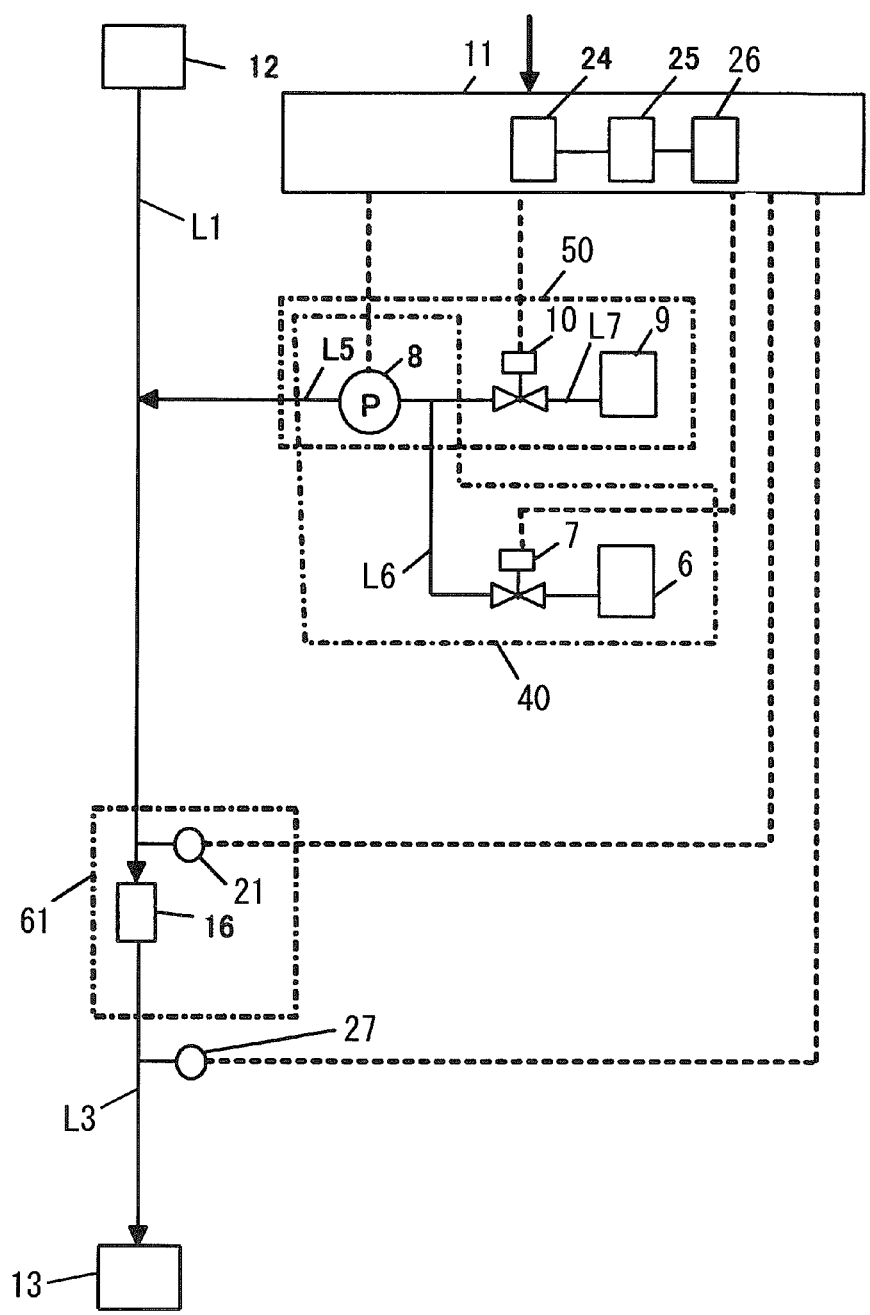
FIG. 4 is a schematic configuration view of a scale suppression apparatus according to a fourth embodiment of the present disclosure.

FIG. 4 is a schematic configuration view of a scale suppression apparatus according to a fourth embodiment of the present disclosure. The scale suppression apparatus according to the fourth embodiment of the present disclosure, as illustrated in FIG. 4, includes the pipe arrangement L1, the first addition unit 40, the second addition unit 50, a scale detection unit 61, the pipe arrangement L3, the pH meter 27, and the controller 11.

The pipe arrangement L1 leads the influent water that has flowed from the influent water inlet 12 to the scale detection unit 61, and one end of the pipe arrangement L1 is connected to an inlet part of the scale detection unit 61.

The first addition unit 40 injects the liquid containing the chelating agent and alkaline agent (i.e., alkaline liquid) into the influent water flowing through the pipe arrangement L1 to make the influent water higher than pH 7. The first addition unit 40 includes the tank 6 configured to reserve the liquid containing the chelating agent and alkaline agent (i.e., alkaline liquid), the pump 8 configured to inject the liquid reserved in the tank 6 into the pipe arrangement L1, the pipe arrangement L6 configured to connect a liquid outlet port of the tank 6 and an inlet port of the pump 8, and the pipe arrangement L5 configured to connect an exhaust port of the pump 8 and an injection port of the pipe arrangement L1.

In addition, the first addition unit 40 has the valve 7 for opening and closing the intake side of the pump 8, where the valve 7 is arranged in the pathway of the pipe arrangement L6.

The second addition unit 50 adds the liquid containing the acid substance (i.e., acid liquid) into the influent water flowing through the pipe arrangement L1 to make the influent water lower than pH 7. The second addition unit 50 includes the tank 9 configured to reserve the liquid containing the acid substance (i.e., acid liquid), the pipe arrangement L7 configured to supply the liquid reserved in the tank 9 to an intake side of the pump 8, and the on-off valve 10 arranged in a pathway of the pipe arrangement L7.

The scale detection unit 61 detects the precipitation state of the scale on a downstream side from the addition point where the chelating agent, the alkaline agent, and the acid substance are added, and includes the scale precipitation unit 16 configured to precipitate the scale generated in the influent water. The scale precipitation unit 16 has a pipe line through which, for example, the influent water flows. The cross section of the flow path in the pipe line is changed as the scale is adhered to the inner face of the pipe line.

Further, the scale detection unit 61 includes a flowmeter 21 configured to measure a flow rate of the influent water flowing into the scale precipitation unit 16 from the pipe arrangement L1, and a signal output from the flowmeter 21 is supplied to the controller 11.

The pipe arrangement L3 supplies the influent water that has flowed through the scale detection unit 61 to the injection well 13, and one end of the pipe arrangement L3 is connected to an outlet part of the scale detection unit 61.

The pH meter 27 measures the pH of the influent water that flows through the pipe arrangement L3. A signal output from the pH meter 27 is supplied to the controller 11 as pH information of the influent water.

The controller 11 controls the pump 8 and the valves 7 and 10 based on the precipitation state of the scale detected by the scale detection unit 61 or the pH of the influent water measured by the pH meter 27, and includes the memory 24 configured to store the flow rate of the influent water (i.e., flow rate below a lower limit threshold) measured by the flowmeter 21 of the scale detection unit 61, the calculation unit 25 configured to calculate a flow rate difference between the flow rate measured by flowmeter 21 after the operation of the first addition unit 40 or the second addition unit 50 and the flow rate stored in the memory 24 (i.e., flow rate below a lower limit threshold), and the comparison unit 26 configured to compare the flow rate difference calculated by the calculation unit 25 with an upper limit threshold and a lower limit threshold.

In the scale suppression apparatus in the fourth embodiment, as illustrated in FIG. 6, the first step S2 of injecting from the first addition unit 40 the liquid containing the chelating agent and alkaline agent into the influent water flowing through the pipe arrangement L1 and the second step S3 of adding the liquid containing the acid substance are switched alternately in a switch step S1 to suppress the generation of the scale. In this case, the first step S2 may be carried out earlier and then the second step S3 may be carried out later, or the second step S3 may be carried out earlier and then the first step S2 may be carried out later.

In the fourth embodiment, when the first step S2 is carried out earlier, scale (for example, CSH) is gradually precipitated at the scale precipitation unit 16 of the scale detection unit 61. The output value (i.e., flow rate difference) from the scale detection unit 61 increases gradually as the first step proceeds, as illustrated in FIG. 7. Then, when the output value (i.e., flow rate difference) from the scale detection unit 61 exceeds the upper limit threshold, the first step S2 is switched to the second step S3, and the liquid containing the acid substance is added to the pipe arrangement L1 from the second addition unit 50.

When the first step S2 is switched to the second step S3, the scale (for example, CSH) precipitated at the scale precipitation unit 16 is dissolved, and the output value (i.e., flow rate difference) from the scale detection unit 61 decreases, accordingly. Then, when the output value (i.e., flow rate difference) from the scale detection unit 61 becomes lower than the lower limit threshold, the second step S3 is switched to the first step S2, and the liquid containing the chelating agent and alkaline agent is added from the first addition unit 40 to the pipe arrangement L1. Subsequently, as discussed above, the first step S2 and the second step S3 are repeated alternately.

On the other hand, when the second step is carried out earlier, for example, amorphous silica is precipitated at the scale precipitation unit 16 of the scale detection unit 61. In this situation, the output value (i.e., flow rate difference) from the scale detection unit 61 gradually increases as the second step proceeds, as illustrated in FIG. 8. Then, when the output value (i.e., flow rate difference) of the scale detection unit 61 exceeds the upper limit threshold, the second step is switched to the first step, and the liquid containing the chelating agent and alkaline agent is added from the first addition unit 40 to the pipe arrangement L1.

When the second step S3 is switched to the first step S2, amorphous silica precipitated at the scale precipitation unit 16 is dissolved, and the output value (i.e., flow rate difference) from the scale detection unit 61 decreases accordingly. Then, when the output value (i.e., flow rate difference) from the scale detection unit 61 becomes lower than the lower limit threshold, the first step S2 is switched to the second step S3, and the liquid containing the acid substance is added to the pipe arrangement L1 from the second addition unit 50. Subsequently, as discussed above, the second step S3 and the first step S2 are repeated alternately.

In the first step S2, the pump 8 is activated together with opening of the valve 7 and closing of the valve 10. Then, the liquid reserved in the tank (i.e., liquid containing the chelating agent and alkaline agent) is injected into the pipe arrangement L1, flowing through the pipe arrangements L6 and L5.

In the second step S3, the pump 8 is activated together with closing of the valve 7 and opening of the valve 10. Then, the liquid reserved in the tank 9 (i.e., liquid containing the acid substance) is injected through the pipe arrangements L7 and L5 to the pipe arrangement L1.

When the liquid containing the chelating agent and alkaline agent is injected into the pipe arrangement L1 from the first addition unit 40, as illustrated in FIG. 9, the liquid reacts with polyvalent metal ions contained in the influent water, and compounds (for example, CSH) are precipitated. In addition, amorphous silica is dissolved (i.e., first step S2).

On the other hand, when the liquid containing the acid substance is injected into the pipe arrangement L1 from the second addition unit 50, as illustrated in FIG. 9, amorphous silica is precipitated. In addition, compounds precipitated (for example, CSH) by reacting with polyvalent metal ions are dissolved (i.e., second step S3).

As in the fourth embodiment, the first step S2 of adding the liquid containing the chelating agent and alkaline agent into the influent water to make the influent water higher than pH 7 and the second step S3 of adding the liquid containing the acid substance to the influent water to make the influent water higher than pH 7 are switched alternately, so that the added amounts of the chelating agent and the alkaline agent can be reduced and reduction of the cost can be achieved.

In addition, the precipitation state of the scale generated in the influent water is detected by the scale detection unit 61, and the operation of the first addition unit 40 and the operation of the second addition unit 50 are switched based on the signal output from the scale detection unit 61, so that the added amounts of the chelating agent and the alkaline agent can be reduced more.

(Fifth Embodiment)

Figure 5:
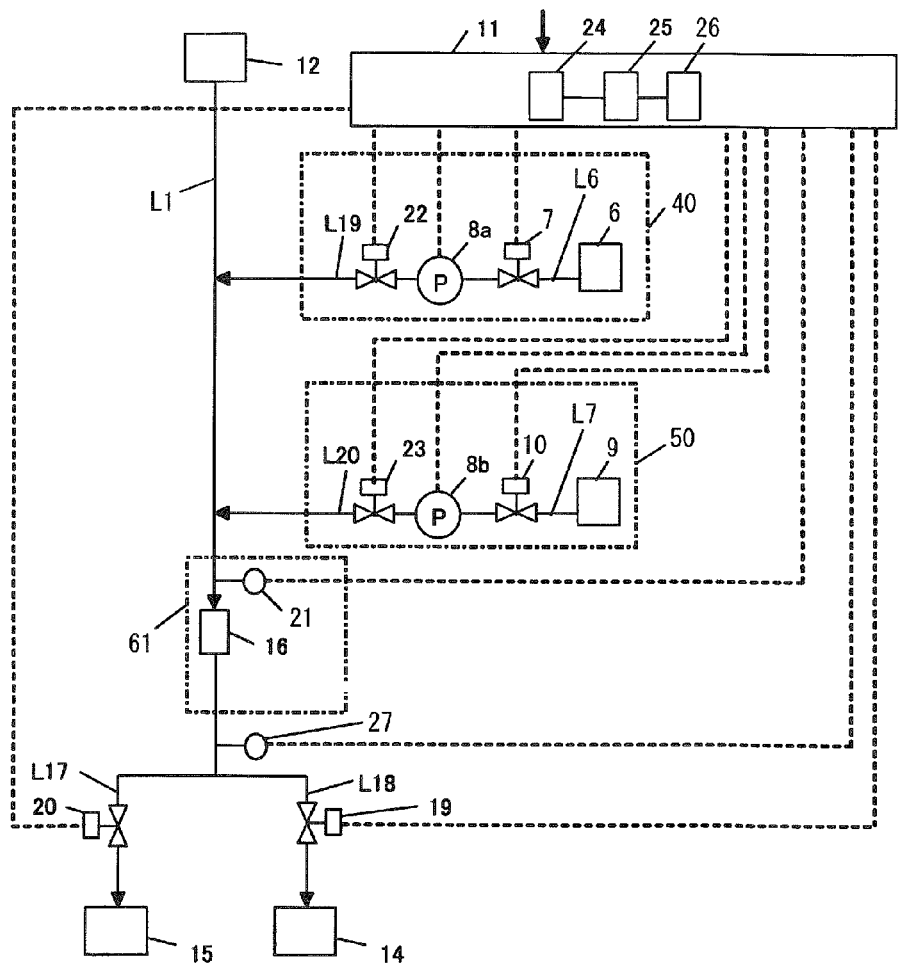
FIG. 5 is a schematic configuration view of a scale suppression apparatus according to a fifth embodiment of the present disclosure.

FIG. 5 is a schematic configuration view of a scale suppression apparatus according to a fifth embodiment of the present disclosure. The scale suppression apparatus according to the fifth embodiment of the present disclosure, as illustrated in FIG. 5, includes the pipe arrangement L1, the first addition unit 40, the second addition unit 50, the scale detection unit 61, pipe arrangements L17 and L18, valves 19 and 20, the pH meter 27, and the controller 11.

The pipe arrangement L1 leads the influent water that has flowed from an influent water inlet 12 to the scale detection unit 61, and one end of the pipe arrangement L1 is connected to an inlet part of the scale detection unit 61.

The first addition unit 40 injects the liquid containing the chelating agent and alkaline agent into the influent water flowing through the pipe arrangement L1 to make the influent water higher than pH 7. The first addition unit 40 includes the tank 6 configured to reserve the liquid containing the chelating agent and alkaline agent (i.e., alkaline liquid), the pump 8a configured to inject the liquid reserved in the tank 6 into the pipe arrangement L1, the pipe arrangement L6 configured to connect a liquid outlet port of the tank 6 and an inlet port of the pump 8a, and the pipe arrangement L19 configured to connect an exhaust port of the pump 8 and an injection port of the pipe arrangement L1.

In addition, the first addition unit 40 has the valves 7 and 22 arranged in the pathways of the pipe arrangements L6 and L19, respectively.

The second addition unit 50 adds the liquid containing the acid substance (i.e., acid liquid) to the influent water flowing through the pipe arrangement L1 to make the influent water lower than pH 7. The second addition unit 50 includes the tank 9 configured to reserve the liquid containing the acid substance, the pump 8b configured to inject the liquid reserved in the tank 9 into the pipe arrangement L1, the pipe arrangement L7 configured to connect the liquid outlet port of the tank 9 and the inlet port of the pump 8b, and the pipe arrangement L20 configured to connect the exhaust port of the pump 8b and the injection port of the pipe arrangement L1.

Further, the second addition unit 50 has the valves 10 and 23 arranged in the pathways of the pipe arrangements L7 and L20, respectively.

The scale detection unit 61 detects the precipitation state of the scale on a downstream side from the addition point into which the chelating agent, the alkaline agent, and the acid substance are added, and includes the scale precipitation unit 16 configured to precipitate the scale generated in the influent water. The scale precipitation unit 16 has a pipe line through which, for example, the influent water flows, and the cross section of the flow path in the pipe line is changed as the scale is adhered to the inner face of the pipe line.

Further, the scale detection unit 61 includes the flowmeter 21 configured to measure a flow rate of the influent water flowing into the scale precipitation unit 16 from the pipe arrangement L1, and the signal output from the flowmeter 21 is supplied to the controller 11.

The pipe arrangement L17 supplies the influent water that has flowed through the scale detection unit 61 to the acidity injection well 15, and is connected to the inlet part of the acidity injection well 15.

The pipe arrangement L18 supplies the influent water that has flowed through the scale detection unit 61 to the alkalinity injection well 14, and is connected to the inlet part of the alkalinity injection well 14.

The valve 19 blocks the influent water that has flowed through the scale detection unit 61 from being injected into the alkalinity injection well 14, and is arranged in the pathway of the pipe arrangement L18.

The valve 20 blocks the influent water that has flowed through the scale detection unit 61 from being injected into the acidity injection well 15, and is arranged in the pathway of the pipe arrangement L17.

The pH meter 27 measures the pH of the influent water that flows through the scale detection unit 61. The signal output from the pH meter 27 is supplied to the controller 11 as pH information of the influent water.

The controller 11 controls the pumps 8a and 8b and the valves 7, 10, 19, 20, 22 and 23 based on the precipitation state of the scale detected by the scale detection unit 61 or the pH of the influent water measured by the pH meter 27. The controller 11 includes the memory 24 configured to store the flow rate of the influent water (i.e., flow rate below the lower limit threshold) measured by the flowmeter 21 of the scale detection unit 61, the calculation unit 25 configured to calculate a flow rate difference between the flow rate measured by flowmeter 21 after the first addition unit 40 or the second addition unit 50 is operated and the flow rate stored in the memory 24 (i.e., flow rate below the lower limit threshold), and the comparison unit 26 configured to compare the flow rate difference calculated by the calculation unit 25 with an upper limit threshold and a lower limit threshold.

In the scale suppression apparatus in the fifth embodiment, as illustrated in FIG. 6, the first step S2 of injecting the liquid containing the chelating agent and alkaline agent into the influent water flowing through the pipe arrangement L1 from the first addition unit 40 and the second step S3 of adding the liquid containing the acid substance from the second addition unit 50 are switched alternately in the switch step S1 to suppress the generation of the scale. In this case, the first step S2 may be carried out earlier and then the second step S3 may be carried out later, or the second step S3 may be carried out earlier and then the first step S2 may be carried out later.

When, in the fifth embodiment, the first step S2 is carried out earlier, scale (for example, CSH) is gradually precipitated at the scale precipitation unit 16 of the scale detection unit 61. In this situation, the output value (i.e., pressure difference) from the scale detection unit 61 increases gradually as the first step S2 proceeds, as illustrated in FIG. 7. Then, when the output value (i.e., pressure difference) from the scale detection unit 60 exceeds the upper limit threshold, the first step S2 is switched to the second step S3, and the liquid containing the acid substance is added to the pipe arrangement L1 from the second addition unit 50.

When the first step S2 is switched to the second step S3, the scale (for example, CSH) precipitated at the scale precipitation unit 16 is dissolved, and the output value (i.e., flow rate difference) from the scale detection unit 61 decreases, accordingly. Then, when the output value (i.e., flow rate difference) from the scale detection unit 61 becomes lower than the lower limit threshold, the second step S3 is switched to the first step S2, and the liquid containing the chelating agent and alkaline agent is added from the first addition unit 40 to the pipe arrangement L1. Subsequently, as discussed above, the first step S2 and the second step S3 are repeated alternately.

On the other hand, when the second step S3 is carried out earlier, for example, amorphous silica is precipitated at the scale precipitation unit 16 of the scale detection unit 61. In this situation, the output value (i.e., flow rate difference) from the scale detection unit 61 gradually increases as the second step S3 proceeds, as illustrated in FIG. 8. Then, when the output value (i.e., flow rate difference) of the scale detection unit 61 exceeds the upper limit threshold, the second step S3 is switched to the first step S2, and the liquid containing the chelating agent and alkaline agent is added from the first addition unit 40 to the pipe arrangement L1.

When the second step S3 is switched to the first step S2, amorphous silica precipitated at the scale precipitation unit 16 is dissolved, and the output value (i.e., flow rate difference) of the scale detection unit 60 decreases accordingly. Then, when the output value (i.e., flow rate difference) from the scale detection unit 60 becomes lower than the lower limit threshold, the first step S2 is switched to the second step S3, and the liquid containing the acid substance is added from the pipe arrangement L1 from the second addition unit 50. Subsequently, as discussed above, switching between the second step S3 and the first step S2 is repeated alternately.

In the first step S2, the pump 8 is activated together with the opening of the valves 7, 19, and 22 and closing of the valves 10, 20, and 23. Then, the liquid reserved in the tank 6 (i.e., the liquid containing the chelating agent and alkaline agent) is injected through the pipe arrangements L6 and L19 into the pipe arrangement L1. In this situation, the influent water come out of the scale detection unit 60 is supplied through the pipe arrangement L18 to the alkalinity injection well 14.

In the second step S3, the pump 8 is activated together with the closing of the valves 7, 19, and 22 and opening of the valves 10, 20 and 23. Then, the liquid (i.e., liquid containing the acid substance) reserved in the tank 9 flows through the pipe arrangements L7 and L20, and is injected into the pipe arrangement L1. In this situation, the influent water exhausted from the scale detection unit 60 is supplied to the acidity injection well 15, flowing through the pipe arrangement L17.

When the liquid containing the chelating agent and alkaline agent is injected into the pipe arrangement L1 from the first addition unit 40, as illustrated in FIG. 9, the liquid reacts with polyvalent metal ions contained in the influent water, and compounds (for example, CSH) are precipitated. In addition, amorphous silica is dissolved (i.e., first step S2).

On the other hand, when the liquid containing the acid substance is added from the second addition unit 50 to the pipe arrangement L1, as illustrated in FIG. 9, amorphous silica is precipitated. In addition, compounds precipitated (for example, CSH) by reacting with polyvalent metal ions are dissolved (i.e., second step S3).

As in the fifth embodiment, the first step S2 of adding the chelating agent and the alkaline agent to the influent water to make the influent water higher than pH 7 and the second step S3 of adding the acid substance to the influent water to make the influent water lower than pH 7 are switched alternately, so that the added amounts of the chelating agent and the alkaline agent can be reduced and reduction of the cost can be achieved.

In addition, the precipitation state of the scale generated in the influent water is detected by the scale detection unit 61, and the operation of the first addition unit 40 and the operation of the second addition unit 50 are switched based on the signal output from the scale detection unit 61, so that the added amounts of the chelating agent and the alkaline agent can be reduced more.

(Sixth Embodiment)

Figure 10:
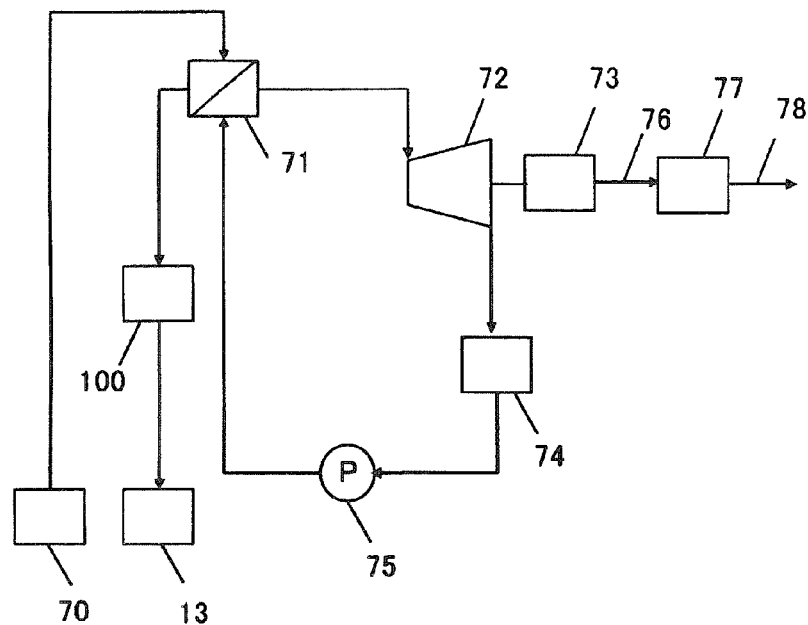
FIG. 10 is a schematic configuration view of a geothermal power generation system according to a sixth embodiment of the present disclosure.
Figure 11:
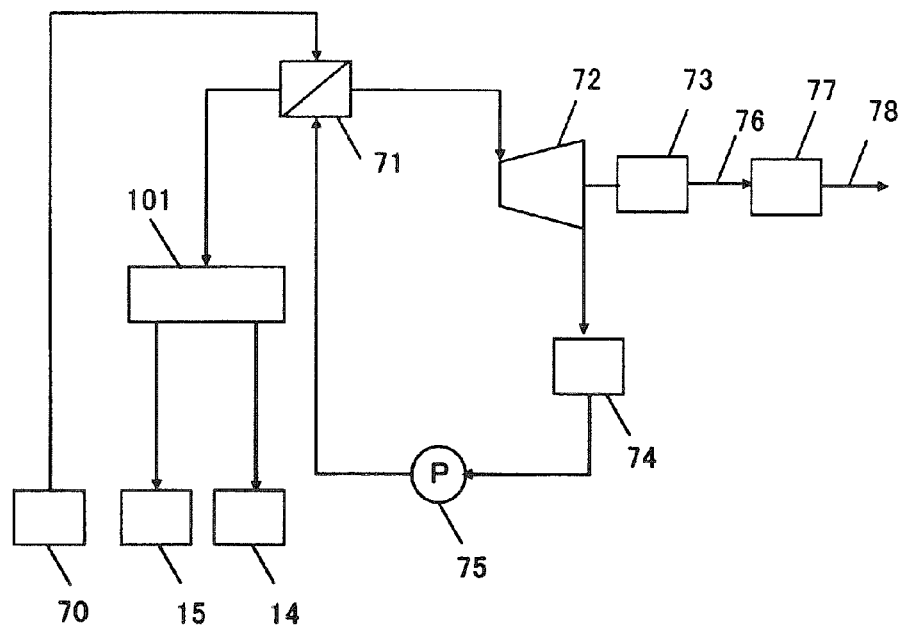
FIG. 11 is a schematic configuration view of a geothermal power generation system according to a seventh embodiment of the present disclosure.

Next, a sixth embodiment of the present disclosure will be described with reference to FIG. 10. The sixth embodiment of the present disclosure is related to a geothermal power generation system including a scale suppression apparatus 100 illustrated in FIG. 1, FIG. 2, or FIG. 4. Specifically, the geothermal power generation system includes an evaporator 71 configured to evaporate the medium with geothermal water taken out of a production well 70, a turbine 72 configured to rotate with the medium evaporated by the evaporator 71, a power generator 73 configured to be coupled to the turbine 72 and generate the power with the rotational power of the turbine 72, a condenser 74 configured to condense the medium come out of the turbine 72, and a circulation pump 75 configured to feed the medium condensed by the condenser 74 to the evaporator 71, so that the geothermal water that has passed through the evaporator 71 is used as the influent water to the scale suppression apparatus 100. The geothermal water that exits the scale suppression apparatus 100 is supplied to the injection well 13. The power generated by the power generator 73 is input into a conditioner 77 through power wiring 76, is converted into a desired voltage current by the conditioner 77, and is then output through power output wiring 78 to the exterior.

(Seventh Embodiment)

Next, a seventh embodiment of the present disclosure will be described with reference to FIG. 10. The seventh embodiment of the present disclosure is related to a geothermal power generation system including a scale suppression apparatus 101 illustrated in FIG. 3 or FIG. 5. Specifically, the geothermal power generation system includes the evaporator 71 configured to evaporate the medium with geothermal water taken out of the production well 70, the turbine 72 configured to rotate with the medium evaporated by the evaporator 71, the power generator 73 configured to be coupled to the turbine 72 and generate the power with the rotational power of the turbine 72, the condenser 74 configured to condense the medium that has come out of the turbine 72, and the circulation pump 75 configured to feed the medium condensed by the condenser 74 to the evaporator 71, so that the geothermal water that has passed through the evaporator 71 is used as the influent water to the scale suppression apparatus 101. Alkali discharged water that exits the scale suppression apparatus 101 is made to flow into the alkalinity injection well 14, whereas acid discharged water is made to flow into the acidity injection well 15. The power generated by the power generator 73 is input into the conditioner 77 through the power wiring 76, is converted into a desired voltage current by the conditioner 77, and is then output through the power output wiring 78 to the exterior.

With such a configuration, it is made possible to prevent the alkaline water and acid water from being mixed together to become neutral at the discharged destination. It is therefore possible to reduce the frequency of maintenance by suppressing the generation of scale.

In some implementations of the first to seventh embodiments, as illustrated in FIG. 8, the second step of adding the acid substance is preferably performed earlier, and then the first step of injecting the chelating agent and the alkaline agent is performed later. Generally speaking, the acid substance is cheaper than the chelating agent or the alkaline agent. In this manner, it is possible to reduce the amounts of the chelating agent and the alkaline agent as compared to the method of performing the first step earlier, as illustrated in FIG. 7.

It is to be noted that when the chelating agent is added at a mol concentration equal to the calcium ion concentration, there are few metals that can be caught by the chelating agent except for calcium in the case of the geothermal water, and the chelating agent will catch all calcium in the geothermal water. Accordingly, CSH may not be precipitated. Therefore, when insufficient chelating agent is added, CSH will be piled up before silica is dissolved and the output value will not become lower than the lower limit threshold. Therefore, it is desirable that the chelating agent concentration be reduced little by little from the mol concentration equal to the calcium ion concentration, so that the output from the scale detection unit becomes lower than the lower limit threshold in the first step.

Heretofore, according to each of the embodiments of the present disclosure, it is possible to suppress the generation of the silica-based scale and the calcium-based scale in a cheaper method than adding the chelating agent to the influent water containing at least the silica component and the calcium component.

The invention claimed is:

1. A scale suppression apparatus of suppressing generation of scale in influent water containing at least a silica component and a calcium component, the scale suppression apparatus comprising:
    a controller configured to alternately switch between an operation of a first addition unit and an operation of a second addition unit, the first addition unit configured to add chelating and alkaline agents to the influent water to make the influent water higher than pH 7, and the second addition unit configured to add an acid substance to the influent water to make the influent water lower than pH 7; and
    a scale detection unit configured to detect a precipitation state of the scale on a downstream side from an addition point to which the chelating and alkaline agents and the acid substance are added,
    wherein the controller is configured to include:
        a memory configured to store an output signal from the scale detection unit; and
        a calculation unit configured to calculate an index of the operations based on the output signal from the scale detection unit, and
    wherein the controller is configured to alternately switch between adding by the first addition unit and adding by the second addition unit by comparing a calculation result of the calculation unit with an upper limit threshold and a lower limit threshold.

2. The scale suppression apparatus according to claim 1, wherein the controller is configured to alternately switch between the operation of the first addition unit and the operation of the second addition unit at a predefined interval.

3. The scale suppression apparatus according to claim 1, wherein the scale detection unit includes:
    a scale precipitation unit;

an upstream-side manometer configured to measure a pressure on an upstream side of the scale precipitation unit and output a signal to the controller; and a downstream-side manometer configured to measure a pressure on a downstream side of the scale precipitation unit and output a signal to the controller.

4. The scale suppression apparatus according to claim 1, wherein the scale detection unit includes:

a scale precipitation unit; and a flowmeter configured to measure a flow rate of water flowing through the scale precipitation unit and output a signal to the calculation unit, and wherein the controller obtains a value by subtracting a subsequent flow rate from the flow rate below the lower limit threshold.

5. The scale suppression apparatus according to claim 1, wherein there is a period while none of the chelating and alkaline agents or the acid substance is added, the period occurring at least one of when the controller switches the operation of the first addition unit to the operation of the second addition unit or when the controller switches the operation of the second addition unit to the operation of the first addition unit.

6. The scale suppression apparatus according to claim 1, wherein the controller is configured to switch from either the first addition unit or the second addition unit to the other of either the first addition unit or the second addition unit when the calculation result is greater than or less than the upper limit threshold.

7. The scale suppression apparatus according to claim 1, wherein the controller is configured to switch from either the first addition unit or the second addition unit to the other of either the first addition unit or the second addition unit when the calculation result is greater than or less than the lower limit threshold.

8. A geothermal power generation system comprising:

an evaporator configured to evaporate a medium with geothermal water;

a turbine configured to rotate with the medium;

a power generator configured to be coupled to the turbine and generate power with rotational power of the turbine;

a condenser configured to condense the medium exiting the turbine;

a circulation pump configured to feed the medium condensed by the condenser to the evaporator; and a scale suppression unit according to claim 1, configured to use the geothermal water that has passed through the evaporator as influent water.

9. A scale suppression method of suppressing generation of scale in influent water containing at least a silica component and a calcium component by an injection operation, the scale suppression method comprising:

a first step of adding chelating and alkaline agents to the influent water to make the influent water higher than pH 7;

a second step of adding an acid substance to the influent water to make the influent water lower than pH 7; and detecting a precipitation state of the scale on a downstream side from an addition point to which the chelating and alkaline agents and the acid substance are added, wherein the first step and the second step are alternately switched by comparing an index of the injection operation calculated based on the precipitation state of the scale with an upper limit threshold and a lower limit threshold.

10. The scale suppression method according to claim 9, wherein there is a period while none of the chelating and alkaline agents or the acid substance is added, the period occurring at least one of when the first step is switched to the second step or when the second step is switched to the first step.

11. The scale suppression method according to claim 9, wherein the first step and the second step are alternately switched when the index of the injection is greater than or less than the upper limit threshold.

12. The scale suppression method according to claim 9, wherein the first step and the second step are alternately switched when the index of the injection is greater than or less than the lower limit threshold.

* * * * *